US011521255B2

(12) United States Patent
Ni et al.

(10) Patent No.: US 11,521,255 B2
(45) Date of Patent: Dec. 6, 2022

(54) ASYMMETRICALLY HIERARCHICAL NETWORKS WITH ATTENTIVE INTERACTIONS FOR INTERPRETABLE REVIEW-BASED RECOMMENDATION

(71) Applicant: NEC Laboratories America, Inc., Princeton, NJ (US)

(72) Inventors: Jingchao Ni, Princeton, NJ (US);
Haifeng Chen, West Windsor, NJ (US);
Bo Zong, West Windsor, NJ (US); Xin Dong, Somerset, NJ (US); Wei Cheng, Princeton Junction, NJ (US)

(73) Assignee: NEC Corporation

( * ) Notice: Subject to any disclaimer, the term of this patent is extended or adjusted under 35 U.S.C. 154(b) by 120 days.

(21) Appl. No.: 16/995,052

(22) Filed: Aug. 17, 2020

(65) Prior Publication Data

US 2021/0065278 A1    Mar. 4, 2021

Related U.S. Application Data

(60) Provisional application No. 62/893,247, filed on Aug. 29, 2019, provisional application No. 62/892,082, filed on Aug. 27, 2019.

(51) Int. Cl.
*G06Q 30/00* (2012.01)
*G06Q 30/06* (2012.01)
*G06N 20/00* (2019.01)

(52) U.S. Cl.
CPC ......... *G06Q 30/0631* (2013.01); *G06N 20/00* (2019.01)

(58) Field of Classification Search
None
See application file for complete search history.

(56) References Cited

U.S. PATENT DOCUMENTS 8,700,480 B1 * 4/2014 Fox .................... G06Q 30/0278
705/26.7
9,672,555 B1 * 6/2017 Dillard .................... G06F 16/35
(Continued)

OTHER PUBLICATIONS

Greg Linden et al. "Amazon.com Recommendations Item-to-Item Collaborative Filtering", IEEE Internet Computing, Jan./Feb. 2003, pp. 76-80. (Year: 2003).*

(Continued)

*Primary Examiner* — Naeem U Haq
(74) *Attorney, Agent, or Firm* — Joseph Kolodka

(57) ABSTRACT

A method for implementing a recommendation system using an asymmetrically hierarchical network includes, for a user and an item corresponding to a user-item pair, aggregating, using asymmetrically designed sentence aggregators, respective ones of a set of item sentence embeddings and a set of user sentence embeddings to generate a set of item review embeddings based on first item attention weights and a set of user review embeddings based on first user attention weights, respectively, aggregating, using asymmetrically designed review aggregators, respective ones of the set of item review embeddings and the set of user review embeddings to generate an item embedding based on a second item attention weights and a user embedding based on second user attention weights, respectively, and predicting a rating of the user-item pair based on the item embedding and the user embedding.

20 Claims, 6 Drawing Sheets

(56) References Cited

U.S. PATENT DOCUMENTS

| | | | | |
|---|---|---|---|---|
| 9,892,414 | B1* | 2/2018 | Henry | G06Q 30/0617 |
| 11,314,950 | B2* | 4/2022 | Wu | G06N 3/049 |
| 2008/0249764 | A1* | 10/2008 | Huang | G06F 40/30 |
| | | | | 704/9 |
| 2010/0049590 | A1* | 2/2010 | Anshul | G06Q 30/02 |
| | | | | 706/54 |
| 2012/0239668 | A1* | 9/2012 | Bhattacharyya | G06Q 10/10 |
| | | | | 707/E17.022 |
| 2013/0218914 | A1* | 8/2013 | Stavrianou | G06F 16/3329 |
| | | | | 707/E17.058 |
| 2016/0364754 | A1* | 12/2016 | Thube | G06Q 30/0255 |
| 2018/0144385 | A1* | 5/2018 | Subramanya | G06Q 30/0621 |
| 2019/0080383 | A1* | 3/2019 | Garcia | G06N 3/0427 |
| 2019/0294671 | A1* | 9/2019 | Chatterjee | G06F 40/268 |
| 2019/0318407 | A1* | 10/2019 | Giridhari | G06Q 30/0627 |
| 2019/0385199 | A1* | 12/2019 | Bender | G06F 16/9535 |
| 2020/0117856 | A1* | 4/2020 | Kumar Karn | G06N 3/0445 |

OTHER PUBLICATIONS

J. Ben Schafer "E-Commerce Recommendation Applications", Data Mining and Knowledge Discovery, 5, 115-153, 2001 (Year: 2001).*

Shuyu Luo "Introduction to Recommender System" Dec. 10, 2018. Retrieved from https://towardsdatascience.com/intro-to-recommender-system-collaborative-filtering-64a238194a26 (Year: 2018).*

Yehuda Koren et al. "Matrix Factorization Techniques For Recommender Systems" IEEE Computer Society, Aug. 2009, pp. 42-49 (Year: 2009).*

Yuan et al. "Learning Item/User Vectors from Comments for Collaborative Recommendation" ICMLC 2017, Feb. 24-26, 2017, ©2017 ACM. ISBN 978-1-4503-4817-1/17/02 (Year: 2017).*

Mike Schuster et al. "Bidirectional Recurrent Neural Networks" IEEE Transactions On Signal Processing, vol. 45, No. 11, Nov. 1997, pp. 2673-2681 (Year: 1997).*

McAuley et al., "Hidden factors and hidden topics: understanding rating dimensions with review text" In RecSys, ACM, Oct. 2013, pp. 165-172.

Ling et al., "Ratings meet reviews, a combined approach to recommend", In RecSys, ACM, Oct. 2014, pp. 105-112.

Bao et al., "TopicMF: Simultaneously exploiting ratings and reviews for recommendation", In AAAI, Jul. 2014, pp. 2-8.

Zheng et al., "Joint deep modeling of users and items using reviews for recommendation" In WSDM, ACM, Feb. 2017, pp. 425-434.

Santos et al., "Attentive pooling networks", arXiv preprint arXiv:1602.03609, Feb. 2016, pp. 1-10.

Catherine et al., "Transnets: Learning to transform for recommendation", In RecSys, ACM, Jun. 2017, pp. 288-296.

Seo et al., "Interpretable convolutional neural networks with dual local and global attention for review rating prediction", In RecSys, ACM. Aug. 2017, pp. 297-305.

Chen et al., "Neural attentional rating regression with review-level explanations" In WWW, International World Wide Neb Conferences Steering Committee, Apr. 2018, pp. 1583-1592.

Wu et al., "Hierarchical user and item representation with three-tier attention for recommendation", In NAACL-HLT, Jun. 2019, pp. 1818-1826.

Tay et al., "Multi-pointer co-attention networks for recommendation", In KDD, ACM, Jun. 2018, pp. 2309-2318.

Jang et al., "Categorical reparameterization with gumbel-softmax", arXiv preprintarXiv:1611.01144, Aug. 2017, pp. 1-13.

* cited by examiner

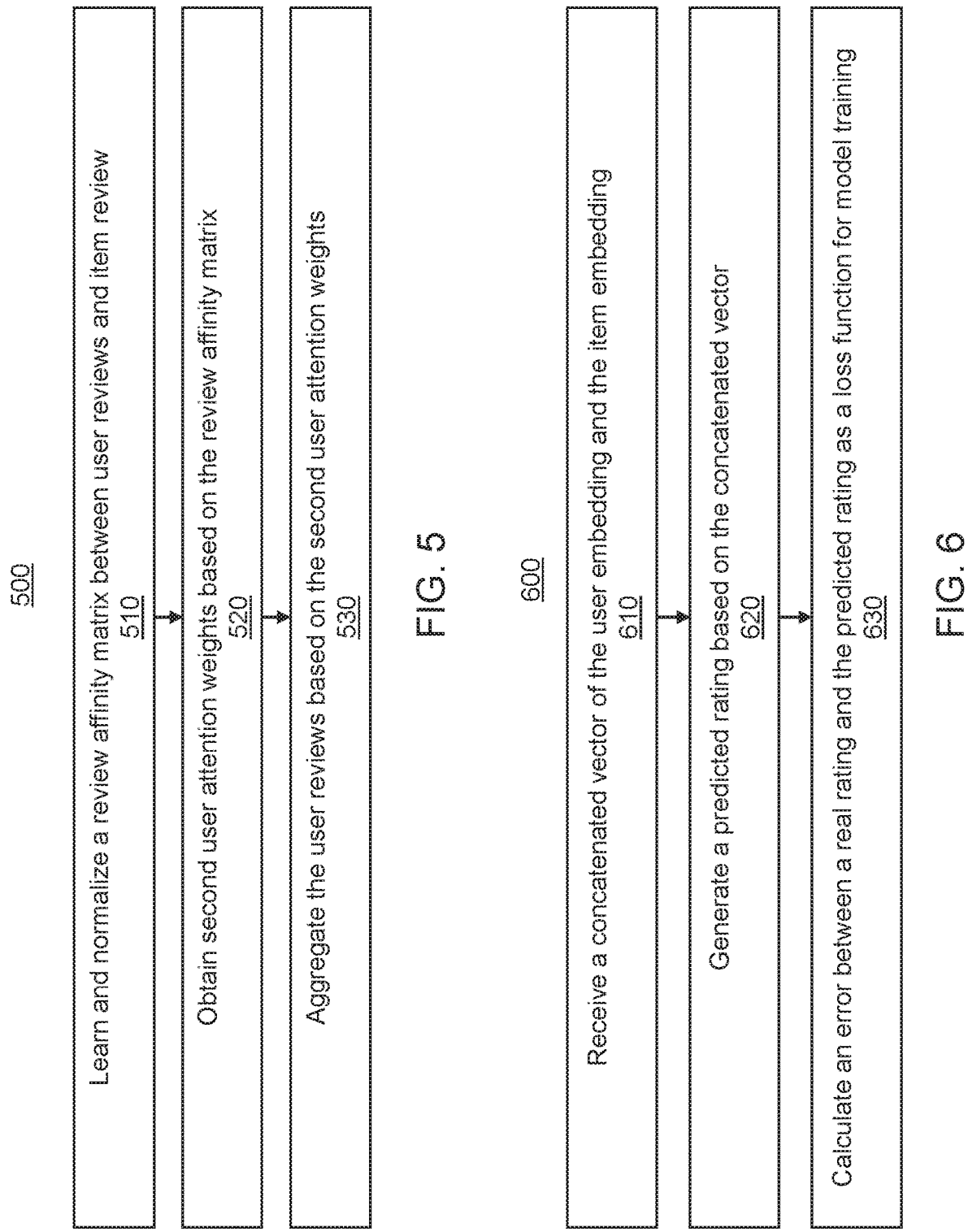

ASYMMETRICALLY HIERARCHICAL NETWORKS WITH ATTENTIVE INTERACTIONS FOR INTERPRETABLE REVIEW-BASED RECOMMENDATION

RELATED APPLICATION INFORMATION

This application claims priority to provisional application Ser. Nos. 62/892,082, filed on Aug. 27, 2019, and 62,893,247, filed on Aug. 29, 2019, incorporated herein by reference herein in their entirety.

BACKGROUND

Technical Field

The present invention relates to artificial intelligence and machine learning, and more particularly to recommendation systems.

Description of the Related Art

A recommendation or recommender system is an information filtering system that seeks to predict a rating or preference a user would have on an item. Existing recommender system methodologies typically merge all reviews of a given user (item) into a long document, and then process user and item documents in the same manner. In practice, however, the user and item documents are notably different. For example, a user's reviews may depict a variety of items that the user has bought and are thus heterogeneous in their topics, while an item's reviews are only about the item itself and thus are homogeneous in their topics.

SUMMARY

According to an aspect of the present invention, a method is provided for implementing a recommendation system using an asymmetrically hierarchical network. The method includes encoding sentences of a set of user historical reviews associated with a user and a set of item historical reviews associated with an item to generate a set of user sentence embeddings and a set of item sentence embeddings, respectively. The user and the item correspond to a user-item pair. The method further includes aggregating, using asymmetrically designed sentence aggregators, respective ones of the set of item sentence embeddings and the set of user sentence embeddings to generate a set of item review embeddings based on first item attention weights and a set of user review embeddings based on first user attention weights, respectively. The method further includes aggregating, using asymmetrically designed review aggregators, respective ones of the set of item review embeddings and the set of user review embeddings to generate an item embedding based on a second item attention weights and a user embedding based on second user attention weights, respectively. The method further includes predicting a rating of the user-item pair based on the item embedding and the user embedding.

According to another aspect of the present invention, a system is provided for implementing a recommendation system using an asymmetrically hierarchical network. The system includes a memory device storing program code and at least one processor device operatively coupled to the memory device. The at least one processor is configured to execute program code stored on the memory device to encode sentences of a set of user historical reviews associated with a user and a set of item historical reviews associated with an item to generate a set of user sentence embeddings and a set of item sentence embeddings, respectively. The user and the item correspond to a user-item pair. The at least one processor device is further configured to execute program code stored on the memory device to aggregate, using asymmetrically designed sentence aggregators, respective ones of the set of item sentence embeddings and the set of user sentence embeddings to generate a set of item review embeddings and a set of user review embeddings, respectively. The at least one processor device is further configured to execute program code stored on the memory device to aggregate, using asymmetrically designed review aggregators, respective ones of the set of item review embeddings and the set of user review embeddings to generate an item embedding and a user embedding, respectively. The at least one processor device is further configured to execute program code stored on the memory device to predict a rating of the user-item pair based on the item embedding and the user embedding.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a block/flow diagram illustrating a system/method for aggregating a set of user review embeddings, in accordance with an embodiment of the present invention;

FIG. 6 is a block/flow diagram illustrating a system/method for predicting a rating of a user-item pair, in accordance with an embodiment of the present invention;

DETAILED DESCRIPTION OF PREFERRED EMBODIMENTS

Figure 1:
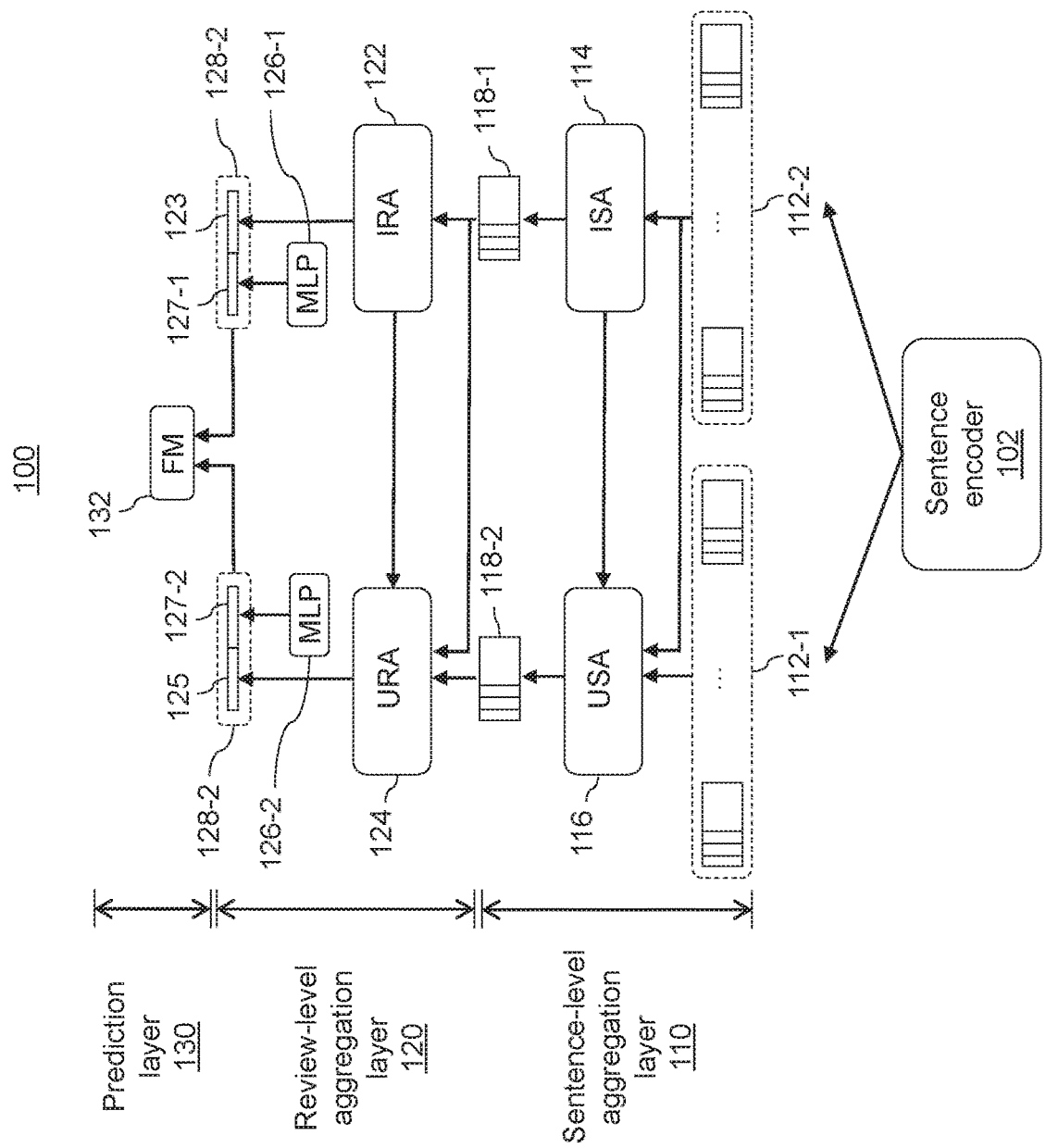
FIG. 1 is a block/flow diagram illustrating an overview of a recommendation system implementing an asymmetrically hierarchical network, in accordance with an embodiment of the present invention.

In accordance with embodiments of the present invention, systems and methods are provided for implementing asymmetrically hierarchical networks (AHNs) with attentive interactions for interpretable review-based recommendation to differentiate the learning of user's embedding and item's embedding from their respective reviews for recommendation. User and item embeddings can be learned in parallel using several asymmetric user and item hierarchical aggregators that pay different attention to a user's reviews and an item's reviews to decide whether the item should be recommended to the user, thus enhancing prediction accuracy and model interpretability. More specifically, asymmetric user and item aggregators of an AHN progressively aggregate important sentences to represent each review, and can aggregate important reviews to represent each user (item). At item's side, attention-based aggregators at sentence-level and review-level can assign high weights to sentences and reviews that are associated with its overall rating (e.g., sentiments on different aspects). At the user's side, an interaction-based co-attentive mechanism is provided to utilize the target item's reviews (sentences) for guiding the search and selection of a homogeneous (sub) set of the user's reviews (sentences) that are most relevant to the target item to reduce the heterogeneity in the topics. This asymmetric aggregation mechanism can uncover "which aspects is a user concerned with" and "how are these aspects evaluated by other users." In this manner, the AHN described herein can dynamically and hierarchically build effective embeddings upon the most useful knowledge for improved personalized recommendation. The embodiments described herein can be implemented within a variety of real-world applications and scenarios including, but not limited to, playlist generators for movie and music services, product recommenders, restaurant recommenders, etc.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now in detail to the figures in which like numerals represent the same or similar elements and initially to FIG. 1, a recommendation system 100 is depicted in accordance with one embodiment of the present invention.

As shown, the system 100 includes a sentence encoder 102. Generally, the sentence encoder 102 aims to transform sentences from a sequence of discrete word tokens to a continuous vector embedding. More specifically, the sentence encoder is configured to encode sentences based on a first set of historical reviews associated with a user (u) and a second set of historical reviews associated with an item (v), with the user and item constituting a user-item pair. The sentence encoder 102 can be implemented using any suitable neural network technique in accordance with the embodiments described herein. Examples of suitable neural network techniques include, but are not limited to, Bidirectional Long Short-term Memory (BiLSTM), Convolutional Neural Network (CNN), Bidirectional Encoder Representations from Transformers (BERT), etc.

In one embodiment, the sentence encoder 102 is configured to encode a sentence by representing the sentence by a sequence of word vectors, learning a vector embedding for the sentence based on the sequence of word vectors, and encoding context information for the at least one sentence based on the vector embedding. Examples of suitable embedding techniques that can be used to represent the sentence by a sequence of word vectors include, but are not limited to, word2ec, GloVe, etc. The vector embedding can illustratively be learned by max-pooling hidden states of a bidirectional recurrent neural network (BiRNN) on the sequence of word vectors, and the context information can illustratively be encoded by applying the BiRNN on the sentence.

For example, suppose that a sentence s has l words. By employing a word embedding matrix $\tilde{E} \in \mathbb{R}^{d \times |V_c|}$, s can be represented by the sequence $[e_1, \ldots, e_l]$, where $e_i$ is the embedding of the i-th word in s, d is the dimensionality of the word embedding and $V_c$ is the complete vocabulary of words. The matrix $\tilde{E}$ can be initialized using word embeddings (e.g., word2vec or GloVe). The matrix $\tilde{E}$ can be fine-tuned during model training to refine the word embeddings.

To learn an embedding for s, a BiLSTM can illustratively be employed on its constituent word embeddings, and max-pooling can be applied on the hidden states to preserve the most informative information. More specifically:

$$s' = \max([\tilde{e}_1, \ldots, \tilde{e}_l]) \quad (1)$$

where s' is the embedding of s and $$\tilde{e}_i = \text{BiLSTM}(\tilde{e}_{i-1}, e_i) \quad (2)$$

where $\tilde{e}_0$ is initialized by an all-zero vector 0.

Suppose that a review has k sentences. The review can be represented by a sequence $[s_1, \ldots, s_k]$, where $s_i$ is the embedding of the i-th sequence of the review, as inferred by Eq. (1). However, using Eq. (1), each $s_i$ only encodes its own semantic meaning, but remains oblivious to any contextual cues from its surrounding sentences in the same review. To further refine the sentence embedding, a context-encoding layer can be introduced by employing another BiLSTM on top of the previous BiLSTM to model the temporal interactions between sentences. That is:

$$\tilde{s}_i = \text{BiLSTM}(\tilde{s}_{i-1}, s_i) \quad (3)$$

where $\tilde{s}_i$ is the final embedding of the i-th sentence in the review and $\tilde{s}_0$ is initialized as 0.

The system 100 is illustratively shown including a sentence-level aggregation layer 110, a review-level aggregation layer 120 and a prediction layer 130.

Generally, the sentence-level aggregation layer 110 is configured to embed each review into a compact vector from its constituent sentences by learning review embeddings in an asymmetric style based on a first set of sentence embeddings associated with the user 112-1 and a second set of sentence embeddings associated with the item 112-2 generated by the sentence encoder 102. More specifically, as will be described in further detail, the first and second sets of sentence embeddings 112-1 and 112-2 can be attentively aggregated into a first set of review embeddings associated with the user and a second set of review embeddings associated with the item, respectively, using asymmetrically designed sentence aggregators. The term "attentively aggregate" as used herein refers to the use of an attention weight mechanism during aggregation. The first set of sentence embeddings 112-1 can be of the form $[\tilde{s}_1^u; \ldots; \tilde{s}_k^u]$, and the second set of sentence embeddings 112-2 can be of the form $[\tilde{s}_1^v; \ldots; \tilde{s}_k^v]$, represents $[\bullet;\bullet]$ the concatenation operation.

For example, to perform attentive aggregation, the sentence-level aggregation layer 110 includes an item sentence aggregator (ISA) 114 configured to extract informative sentences containing descriptions and sentiments of the item based on the second set of sentence embeddings 112-2, and a user sentence aggregator (USA) 116 configured to learn attention weights on user sentences based on the first and second sets of sentence embeddings 112-1 and 112-2, and. Accordingly, the ISA 114 and the USA 116 are asymmetric with respect to one another.

Given an item, sentences that contain other users' sentiments (or evaluations) on its aspects can be useful to determine an overall rating. To build an informative embedding for the item's review upon such sentences, the ISA 114 uses a sentence-level attention network to aggregate the second set of sentence embeddings 112-2 based on item attention weights and generate a set of review embeddings associated with the item 118-1.

For example, the ISA 114 can generate a set of m concatenated review embeddings associated with the item v 118-1, denoted as $r^v = [r_1^v; \ldots; r_m^v]$ as follows:

$$r^v = \Sigma_{i=1}^k \alpha_i^v \tilde{s}_i^v \quad (4)$$

where $\alpha_i^v$ is the i-th item attention weight assigned to sentence $\tilde{s}_i^v$ and $\Sigma_{i=1}^k \alpha_i^v = 1$. The attention weight $\alpha_i^v$ quantifies the "informativeness" of sentence $\tilde{s}_i^v$ with respect to the item v's overall rating, compared to other sentences. For example, the attention weight $\alpha_i^v$ can be calculated by:

$$\alpha_i^v = \frac{\exp(v_S^T \tanh((W_S \tilde{s}_i^v) \odot \sigma(\hat{W}_S \tilde{s}_i^v)))}{\Sigma_{j=1}^k \exp(v_S^T \tanh((W_S \tilde{s}_j^v) \odot \sigma(\hat{W}_S \tilde{s}_j^v)))} \quad (5)$$

where $v_s^T \in \mathbb{R}^{h \times 1}$, $W_s \in \mathbb{R}^{h \times d}$ and $\hat{W}_s \in \mathbb{R}^{h \times d}$ are learnable parameters, $\odot$ is the Hadamard or element-wise product, and $\sigma(\bullet)$ is the sigmoid function. The hyperbolic tangent function non-linearity is used to include both negative and positive values for proper gradient flow. Such as formulation allows for the discovery of key factors with respect to the final rating, which corresponds to sentences with rich sentiment information (as desired). The approximate linearity of the hyperbolic tangent in $[-1, 1]$ could limit the expressiveness of the model. To address this, in one embodiment, a non-linear gating mechanism can be used. For example, in this illustrative embodiment, the gating mechanism $\sigma(\hat{W}_s \tilde{s}_i^v)$ is used in the attention weight calculation to improve model performance.

The USA 116 is an interaction-based sentence aggregator for users configured to receive the item attention weights calculated by ISA 114 and the sets of sentence embeddings 112-1, 112-2 and generate a set of review embeddings associated with the user 118-2. For example, USA 116 can generate a set of n concatenated review embeddings associated with the user 118-2, denoted as $r^u = [r_1^u; \ldots; r_n^u]$.

More specifically, given the user-item pair, the purpose of the USA 116 is to select homogeneous subset of sentences from each of the user's reviews such that the sentences of the homogeneous subset are relevant to the item to be recommended (the "target" item). For example, the USA 116 can learn and normalize an affinity matrix between user sentences and item sentences, obtain attention weights for the user sentences based on the affinity matrix, and aggregate sentences to obtain an embedding for each review. In one embodiment, the attention weights for the user sentences can be obtained by performing row-wise max-pooling on the affinity matrix.

Each review can illustratively be represented by a review matrix $R=[\tilde{s}_1; \ldots; \tilde{s}_k] \in \mathbb{R}^{d \times k}$. Suppose that the user u has n reviews and the item v has m reviews. The m sentences of the item can be concatenated to form $[R_1^v; \ldots; R_m^v] \in \mathbb{R}^{d \times mk}$. The constituent sentences are all relevant to the target item and thus can be used to guide the search of similar sentences from the user's reviews. To this end, an affinity matrix $G_i$ can be calculated by iterating over each user review matrix $R_i^u (1 \le i \le n)$ as follows:

$$G_i = \phi(f(R_i^u)^T M_s f([R_1^v; \ldots; R_m^v])) \quad (6)$$

where $M_s \in \mathbb{R}^{d_s \times d_s}$ is a learnable parameter, $\phi(\bullet)$ is an activation function such as, e.g., a rectified linear unit (ReLU), and $f(\bullet)$ is a mapping function such as, e.g., a multi-layer perceptron (MLP). If $f(\bullet)$ is an identity mapping, Eq. (6) becomes a bilinear mapping. Here, the (p,q)-th entry of $G_i$ represents the affinity between the p-th sentence of $R_i^u$ and the q-th sentence of $[R_1^v; \ldots; R_m^v]$. In this illustrative embodiment, the rows of $G_i$ can correspond to the user's sentence, and the columns of $G_i$ can correspond to the item's sentence. However, such an embodiment should not be considered limiting.

To measure how relevant the p-th sentence of the user's review $R_i^u$ is to the target item, a maximum value in the p-th row of the affinity matrix $G_i$ can be used. The intuition is that, if a user's sentence (e.g., a row of $G_i$) has a large affinity to at least one sentence of the target item (e.g., a column of $G_i$) such that the maximal affinity of the row is large, then the user's sentence is relevant to the target item.

However, not all sentences of a target item review may be useful for searching for relevant sentences from a user review. For instance, a sentence in a target item review of "I received it three days ago." conveys little information about the target item, and hence cannot aid in identifying relevant sentences from the user. In fact, such a sentence can introduce noise into the affinity matrix.

To solve this problem, the attention weights $\alpha_i^v$ of all the sentences of the target items can be concatenated to form an attention weight vector $\alpha^v \mathbb{R}^{1 \times mk}$ and a Hadamard product can be computed between each row of $G_i$ and the attention weight vector $\alpha^v$. In this manner, the (p,q)-th entry is high only if the p-th sentence of the user is similar to the q-th sentence of the target item and the q-th sentence of the target item is non-trivial. For example, attention weights for the sentences in $R_i^u$ for each $i \in [1, n]$, $\alpha_i^u$, can be calculated by the USA 116 as follows:

$$\alpha_i^u = \text{softmax}(\max_{row}(G_i \odot_{row} \alpha^v)) \quad (7)$$

where $\max_{row}$ refers to row-wise max-pooling for obtaining the maximum affinity and $\odot_{row}$ refers to the Hadamard product between each row. Intuitively, $(\alpha_i^u)_j$ is large if the j-th sentence in the i-th review of the user describes some aspects of some item that is highly similar to the target item. This enables selection of a homogeneous subset of sentences from the user.

Then, the attention weights $\alpha_i^u$ can be used to aggregate the sentences in $R_i^u$ to infer an embedding of the i-th review for the user and generate the set of review embeddings associated with the user 118-2 as follows:

$$r_i^u = \Sigma_{j=1}^k (\alpha_i^u)_j (R_i^u)_{*j} \quad (8)$$

where $(R_i^u)_{*j}$ is the j-th column of $R_i^u$. Recall that $R_i^u = [\tilde{s}_1^u; \ldots; \tilde{s}_k^u]$, where each column of $R_i^u$ is a sentence embedding. Note that all review embeddings associated with the user $r_1^u, \ldots, r_n^u$ are calculated by iterative over i for i $\in [1, n]$.

The co-attentive mechanism used in the sentence-level aggregation level 110 considers only one side of the affinity matrix (e.g., the user side), and the affinity matrix is adapted by row-wise multiplication of the item attention weight matrix to quantify the utility of the item's sentences. Thus, the methodology employed by the sentence-level aggregation level 110 is designed for learning asymmetric attentions from user-item interactions.

At this point, we have obtained a set of review embeddings associated with the item 118-1 (e.g., from Eq. (4)) and a set of review embeddings associated with the user 118-2 (e.g., from Eq. (8)). Based on these sets of review embeddings 118-1 and 118-2, the review-level aggregation layer 120 is configured to infer or learn user and item embeddings. More specifically, as will be described in further detail, the first and second sets of review embeddings 118-1 and 118-2 can be attentively aggregated using asymmetrically designed review aggregators.

To perform the attentive aggregation, the review-level aggregation layer 120 includes an item review aggregator (IRA) 122 configured to generate an aggregated item embedding 123 and a user review aggregator (URA) 124 configured to generate an aggregated user embedding 125.

Different reviews can exhibit different degrees of informativeness in modeling users and items. For example, an item's reviews can be homogeneous. Thus, reviews with rich descriptions regarding relevant aspects and corresponding sentiments can be of interest. To attend to such reviews, similar to Eq. (4), the review embeddings can be aggregated by the IRA 122 to generate the aggregated item review embedding 123, $\tilde{v}$, as:

$$\tilde{v} = \Sigma_{i=1}^m \beta_i^v r_i^v \quad (9)$$

where $\beta_i^v$ is the i-th item attention weight assigned to the review $r_i^v$ and $\Sigma_{i=1}^k \beta_i^v = 1$. The attention weight $\beta_i^v$ assigned quantifies the "informativeness" of the review $r_i^v$ with respect to the item v's overall rating. For example, the attention weight $\beta_i^v$ can be calculated by:

$$\beta_i^v = \frac{\exp(v_r^T \tanh((W_r r_i^v) \odot \sigma(\hat{W}_r r_i^v)))}{\Sigma_{j=1}^k \exp(v_r^T \tanh((W_r r_j^v) \odot \sigma(\hat{W}_r r_j^v)))} \quad (10)$$

where $v_r^T \in \mathbb{R}^{h \times 1}$, $W_r \in \mathbb{R}^{h \times d}$ and $\hat{W}_r \in \mathbb{R}^{h \times d}$ are learnable parameters, $\odot$ is the Hadamard or element-wise product, and $\sigma(\bullet)$ is the sigmoid function. The hyperbolic tangent function non-linearity is used to include both negative and positive values for proper gradient flow. Such as formulation allows for the discovery of key factors with respect to the final rating, which corresponds to sentences with rich sentiment information (as desired). The approximate linearity of the hyperbolic tangent in $[-1, 1]$ could limit the expressiveness of the model. To address this, in one embodiment, a non-linear gating mechanism can be used. For example, in this illustrative embodiment, the gating mechanism $\sigma(\hat{W}_r r_i^v)$ is used in the attention weight calculation to improve model performance.

At the same time, as has been previously mentioned above, a user's reviews may be heterogeneous since not all of the reviews of the user may be relevant to the target item. Thus, similar to Eq. (6) and Eq. (7), given a user-item pair, a review-level co-attentive network is designed to select reviews from the user as guided by the review of the item.

For example, the URA 124 can be configured to compute a second affinity matrix, G, as follows:

$$G = \phi(f(r_1^v; \ldots; r_n^u)^T M_r f([r_1^v; \ldots; r_m^v])) \quad (11)$$

where $M_r \in \mathbb{R}^{d_s \times d_s}$ is a learnable parameter, $\phi(\cdot)$ activation function such as, e.g., a ReLU and $f(\cdot)$ is a mapping function such as, e.g., an MIT, If $f(\cdot)$ is a identity mapping, Eq. (11) becomes a bilinear mapping. Here, the (p,q)-th entry of G represents the affinity between the p-th review of the user and the q-th review of the item. In this illustrative embodiment, the rows of G can correspond to the user's review, and the columns of G can correspond to the item's review. However, such an embodiment should not be considered limiting.

Then, the attention weights for the reviews of the user, $\beta^u$, can be calculated by the URA 124 to adapt G to encode important reviews of the item by:

$$\beta^u = \text{softmax}(\max_{row}(G \odot_{row} \beta^v)) \tag{12}$$

where $\max_{row}$ refers to row-wise max-pooling for obtaining the maximum affinity, $\odot_{row}$ refers to the Hadamard product between each row, and $\beta^v = [\beta_1^v, \ldots \beta_m^v]$ (from Eq. (10)). Finally, the review embeddings can be aggregated by the URA 124 to generate the aggregated user review embedding 125, as:

$$\tilde{u} = \sum_{i=1}^n \beta_i^u r_i^u \tag{13}$$

Although the aggregated review embeddings 123 and 125 contain rich semantic information from reviews, there may be some latent characteristics of users (items) that are not encoded by their reviews, but can be inferred from rating patterns. For instance, a picky user might tend to uniformly pick lower ratings than a more easygoing user. To encode such user preferences, a one-hot representation of the ID of each user (item) can be embedded using MLPs 126-1 and 126-2 to obtain an item embedding vector 127-1 represented by $\hat{i}$ and a user embedding vector 127-2 represented by $\hat{u}$, respectively. The embedding vectors 127-1 and 127-2 directly correlate with the ratings of the item/user, and thus can capture latent rating patterns. A final item embedding 128-1 can then be generated by concatenating the aggregated item review embedding 123 and the embedding vector 127-1 ($\check{v} = [\tilde{v}; \hat{v}]$) and a final user embedding 128-2 can then be generated by concatenating the aggregated user review embedding 125 and the embedding vector 127-2 ($\check{u} = [\tilde{u}; \hat{u}]$).

The prediction layer 130 includes a component 132 configured to predict a rating of the user-item pair. More specifically, the component 132 is configured to receive the final item embedding 128-1 and the final user embedding 128-2, concatenate the final embeddings 128-1 and 128-2 to generate a final concatenated embedding, and feed the final concatenated into a predictive function to predict a rating of the user-item pair. In this illustrative embodiment, the component 132 is realized as a parameterized factorization machine (FM), which can model pairwise interactions between the input features for improving recommendation performance.

For example, given an input $x \in \mathbb{R}^{d \times 1}$, a predictive function $g(\cdot)$ can be defined as:

$$g(x) = b + \sum_{i=1}^d w_i x_i + \sum_{i=1}^d \sum_{j=i+1}^d \langle z_i, z_j \rangle x_i x_j \tag{14}$$

where b is a bias term, $w_i$ is a parameter for linear regression, $\{z_i\}_{i=1}^d$ are factorized parameters for modeling pair-wise interactions between $x_i$ and $x_j$, $\langle \cdot, \cdot \rangle$ denotes the inner product, and the output of g(x) is the predictive rating.

To learn model parameters, the difference between the true ratings and the predicted ratings can be minimized. For example, the difference can be measured by the mean squared error, $\ell$, as:

$$\ell = \frac{1}{c} \sum_{i=1}^c (y_i - g([\check{u}; \check{v}]))^2 \tag{15}$$

where c is the total number of user-item pairs in the training data and $y_i$ is the truth rating of the i-th user-item pair. The $\ell$ in Eq. (15) serves as a loss function for model training.

Figure 2:
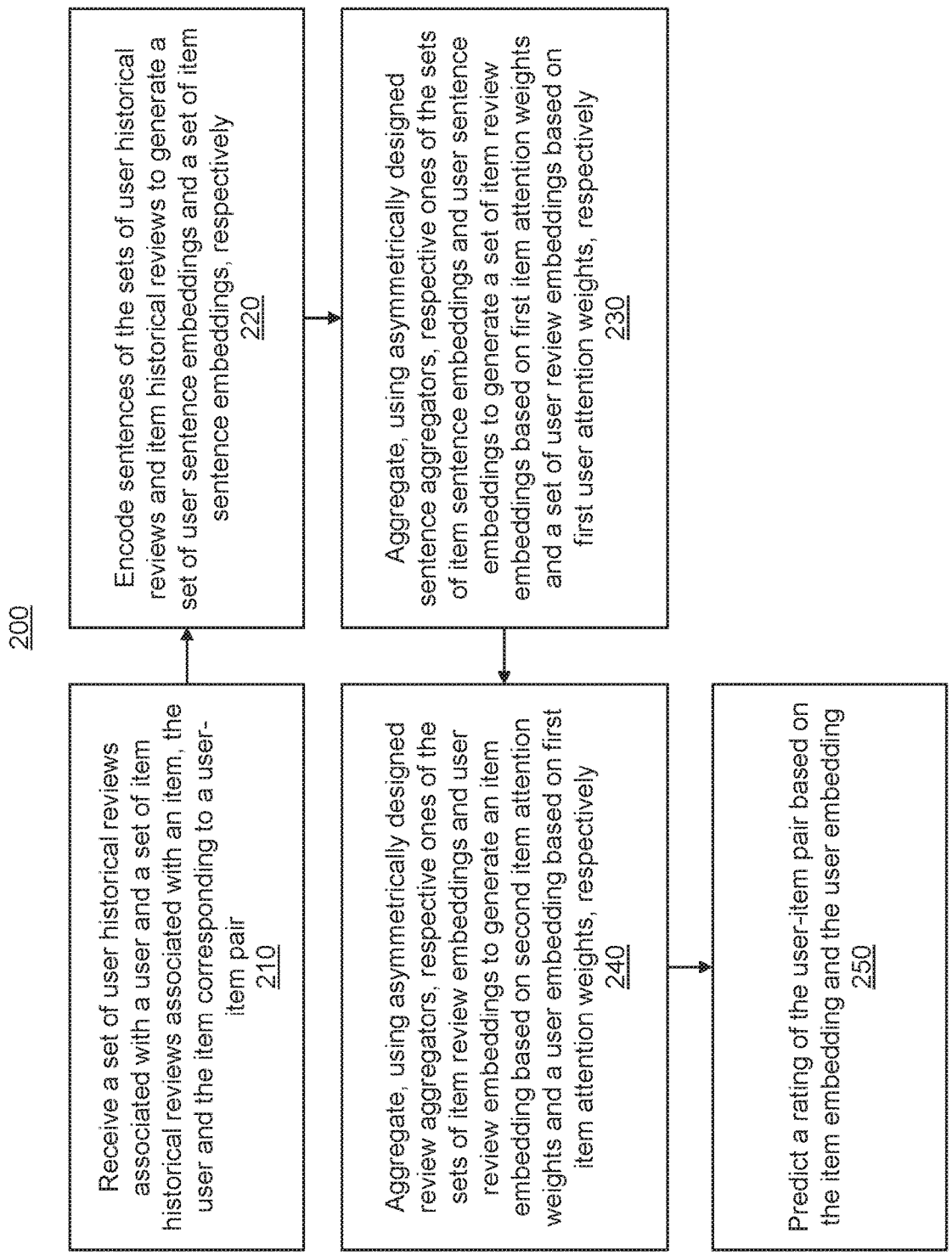
FIG. 2 is a block/flow diagram illustrating a system/method for implementing a recommendation system using an asymmetrically hierarchical network, in accordance with an embodiment of the present invention.

Referring now to FIG. 2, a block/flow diagram is provided illustrating a system/method 200 for implementing a recommendation system using an asymmetrically hierarchical network (AHN).

At block 210, a set of user historical reviews associated with a user and a set of item historical reviews associated with an item are received, with the user and the item corresponding to a user-item pair.

At block 220, sentences of the sets of user historical reviews and item historical reviews are encoded to generate a set of user sentence embeddings and a set of item sentence embeddings, respectively. Any suitable neural network technique can be used to perform the encoding at block 220 in accordance with the embodiments described herein. Examples of suitable neural network techniques include, but are not limited to, Bidirectional Long Short-term Memory (BiLSTM), Convolutional Neural Network (CNN), Bidirectional Encoder Representations from Transformers (BERT), etc. Further details regarding block 220 are described above with reference to FIG. 1 and will now be described below with reference to FIG. 3.

Figure 3:
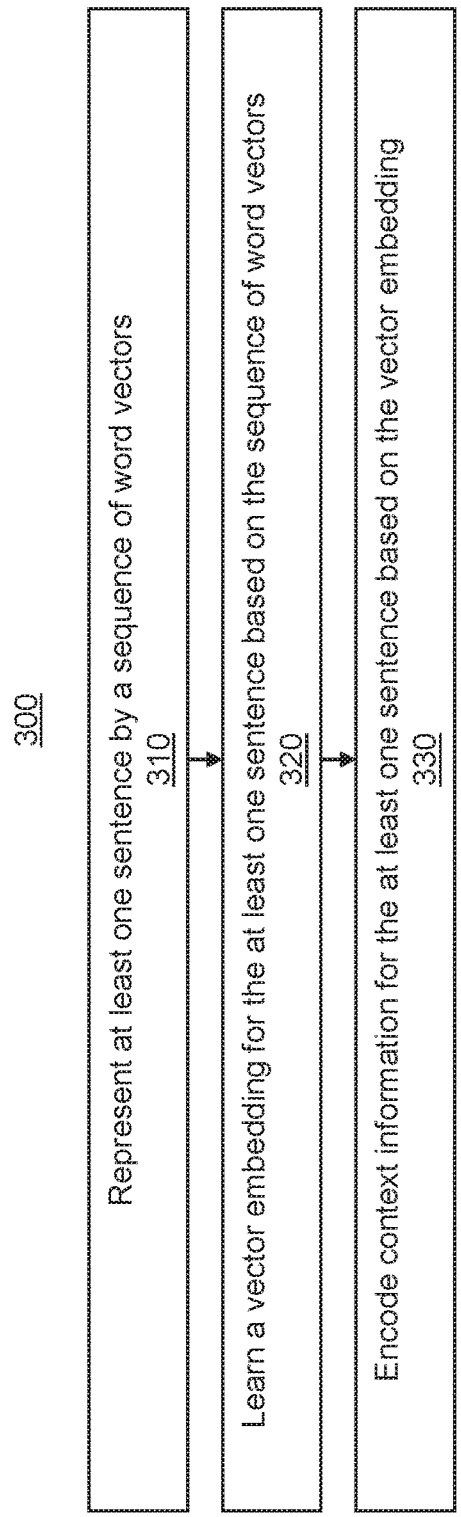
FIG. 3 is a diagram illustrating a block/flow diagram illustrating a system/method for performing sentence encoding, in accordance with an embodiment of the present invention.

Referring now to FIG. 3, a block/flow diagram is provided illustrating a system/method 300 for performing sentence encoding. The system/method 300 can be used to implement block 220 of FIG. 2.

At block 310, at least one sentence is represented by a sequence of word vectors. For example, the at least one sentence can be at least one sentence of a historical review from a set of historical reviews. Examples of suitable embedding techniques that can be used to represent the sentence by a sequence of word vectors include, but are not limited to, word2vec, GloVe, etc.

At block 320, a vector embedding for the at least one sentence is learned based on the sequence of word vectors. In one embodiment, learning the vector embedding for the at least one sentence includes max-pooling hidden states of a bidirectional recurrent neural network (BiRNN) on the sequence of word vectors.

At block 330, context information for the at least one sentence is encoded based on the vector embedding. In one embodiment, encoded the context information for the at least one sentence includes applying the BiRNN on the sequence of sentences in each review.

Referring back to FIG. 2, at block 230, asymmetrically designed sentence aggregators are used to aggregate respective ones of the sets of item sentence embeddings and user sentence embeddings to generate a set of item review embeddings based on first item attention weights and a set of user review embeddings based on first user attention weights, respectively. More specifically, the asymmetrical designed sentence aggregators include an item sentence aggregator (ISA) to generate the set of item review embeddings a user sentence aggregator (USA) to generate the set of user review embeddings.

The ISA is an attentive aggregator used to extract informative sentences containing descriptions and sentiments of the at least one item. To build an informative embedding for the item's review upon such sentences, the ISA uses a sentence-level attention network to aggregate the set of item sentence embeddings based on the first item attention weights and generate the set of (concatenated) item review embeddings. In one embodiment, a gating mechanism can be used in the first item attention weight calculation to improve model performance. Further details regarding the functionality of the ISA are described above with reference to FIG. 1.

The USA is an interaction-based sentence aggregator for users configured to generate the set of (concatenated) user review embeddings based on the item attention weights calculated by ISA and the set of user sentence embeddings. More specifically, given the user-item pair, the USA is configured to select a homogeneous subset of sentences from each of the user's reviews such that the sentences of the homogeneous subset are relevant to the item to be recommended (the "target" item). Further details regarding the functionality of the USA are described above with reference to FIG. 1 and will now be described below with reference to FIG. 4.

Figure 4:
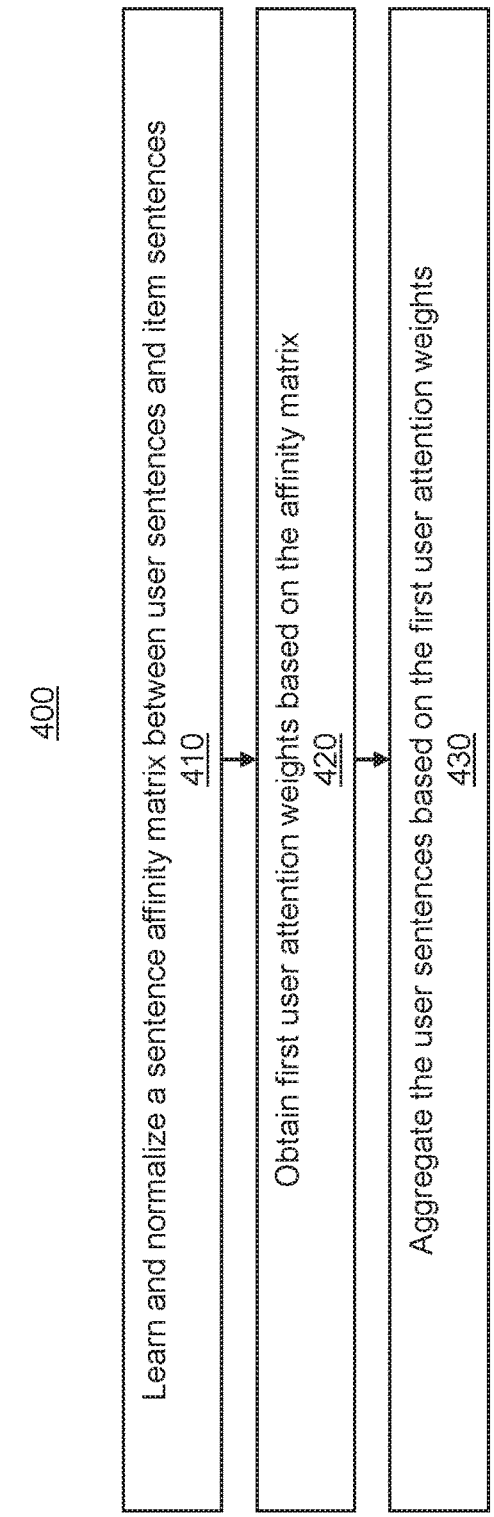
FIG. 4 is a block/flow diagram illustrating a system/method for aggregating a set of user sentence embeddings, in accordance with an embodiment of the present invention.

Referring now to FIG. 4, a block/flow diagram is provided illustrating a system/method 400 for aggregating user sentences. For example, the system/method 400 can be used by the user review aggregator (USA) of FIG. 2.

At block 410, a sentence affinity matrix between user sentences and item sentences is learned and normalized.

At block 420, first user attention weights are obtained based on the sentence affinity matrix. In one embodiment, obtaining the first user attention weights includes performing row-wise max-pooling on the sentence affinity matrix and the first item attention weights for obtaining the maximum affinity.

At block 430, the user sentence embeddings are aggregated based on the first user attention weights.

Referring back to FIG. 2, at block 240, asymmetrically designed review aggregators are used to aggregate respective ones of the sets of item review embeddings and user review embeddings to generate an item embedding and a user embedding, respectively. Such review aggregation is performed to infer or learn user and item embeddings. More specifically, the asymmetrical designed review aggregators include a user review aggregator (URA) and an item review aggregator (IRA).

Similar to the ISA, the IRA is an attentive aggregator used to extract informative reviews containing descriptions and sentiments of the at least one item. The IRA uses a review-level attention network to aggregate the set of item review embeddings based on second item attention weights and generate the item embedding. In one embodiment, a gating mechanism can be used in the second item attention weight calculation to improve model performance. Further details regarding the functionality of the IRA are described above with reference to FIG. 1.

Similar to the USA, the URA is an interaction-based review aggregator for users configured to generate the user embedding based on the second item attention weights calculated by ISA and the set of user review embeddings. More specifically, given the user-item pair, the USA is configured to select a homogeneous subset of sentences from each of the user's reviews such that the sentences of the homogeneous subset are relevant to the item to be recommended (the "target" item). Further details regarding the functionality of the URA are described above with reference to FIG. 1 and will now be described below with reference to FIG. 5.

Referring now to FIG. 5, a block/flow diagram is provided illustrating a system/method 500 for aggregating user reviews. For example, the system/method 500 can be used by the user review aggregator (URA) of FIG. 2.

At block 510, a review affinity matrix between user reviews and item reviews is learned and normalized. In one embodiment, the rows of the review affinity matrix can correspond to the user's review and the columns of the review affinity matrix can correspond to the items' review. However, such an embodiment should not be considered limiting.

At block 520, second user review attention weights are obtained based on the review affinity matrix. In one embodiment, obtaining the second user attention weights includes performing row-wise max-pooling on the review affinity matrix and the second item attention weights for obtaining the maximum affinity.

At block 530, the user reviews are aggregated based on the second user attention weights.

Referring back to FIG. 2, at block 250, a rating of the user-item pair is predicted based on a concatenation of the item embedding and the user embedding. Further details regarding block 250 are described above with reference to FIG. 1 and will be described below with reference to FIG. 6.

Referring now to FIG. 6, a block/flow diagram is provided illustrating a system/method 600 for predicting a rating of a user-item pair.

At block 610, a concatenated vector of a user embedding and an item embedding are received. In one embodiment, a parameterized factorization machine (FM) is configured to receive the concatenated vector.

At block 620, a predicted rating is generated based on the concatenated vector. In one embodiment, calculating the predicted rating includes using a regression component and a feature interaction component.

At block 630, an error between a real rating and the predicted rating is calculated as a loss function for model training. In one embodiment, the error is a mean squared error.

Figure 7:
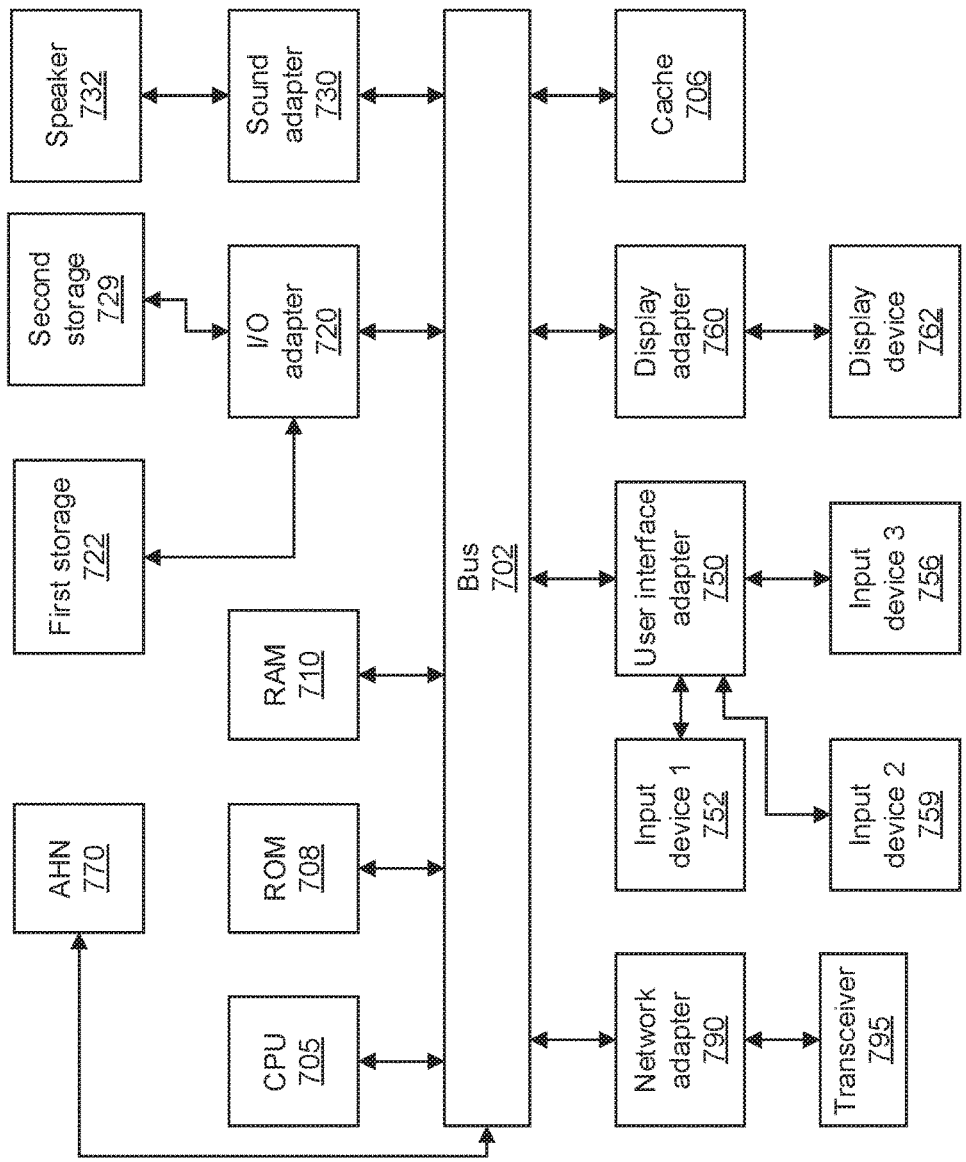
FIG. 7 is a block/flow diagram illustrating a computer system, in accordance with an embodiment the present invention.

Referring now to FIG. 7, an exemplary computer system 700 is shown which may represent a server or a network device, in accordance with an embodiment of the present invention. The computer system 700 includes at least one processor (CPU) 705 operatively coupled to other components via a system bus 702. A cache 706, a Read Only Memory (ROM) 708, a Random-Access Memory (RAM) 710, an input/output (I/O) adapter 720, a sound adapter 730, a network adapter 790, a user interface adapter 750, and a display adapter 760, are operatively coupled to the system bus 702.

A first storage device 722 and a second storage device 729 are operatively coupled to system bus 702 by the I/O adapter 520. The storage devices 722 and 729 can be any of a disk storage device (e.g., a magnetic or optical disk storage device), a solid state magnetic device, and so forth. The storage devices 722 and 729 can be the same type of storage device or different types of storage devices.

A speaker 732 may be operatively coupled to system bus 702 by the sound adapter 730. A transceiver 795 is operatively coupled to system bus 702 by network adapter 790. A display device 762 is operatively coupled to system bus 702 by display adapter 760.

A first user input device 752, a second user input device 759, and a third user input device 756 are operatively coupled to system bus 702 by user interface adapter 750. The user input devices 752, 759, and 756 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 752, 759, and 756 can be the same type of user input device or different types of user input devices. The user input devices 752, 759, and 756 are used to input and output information to and from system 700.

Asymmetrically hierarchical network (AHN) component 770 may be operatively coupled to system bus 702. AHN component 770 is configured to perform one or more of the operations described above. AHN component 770 can be implemented as a standalone special purpose hardware device, or may be implemented as software stored on a storage device. In the embodiment in which AHN component 770 is software-implemented, although shown as a separate component of the computer system 700, AHN component 770 can be stored on, e.g., the first storage device 722 and/or the second storage device 729. Alternatively, AHN component 770 can be stored on a separate storage device (not shown).

Of course, the computer system 700 may also include other elements (not shown), as readily contemplated by one of skill in the art, as well as omit certain elements. For example, various other input devices and/or output devices can be included in computer system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 700 are readily contemplated by one of ordinary skill in the art given the teachings of the present invention provided herein.

Figure 8:
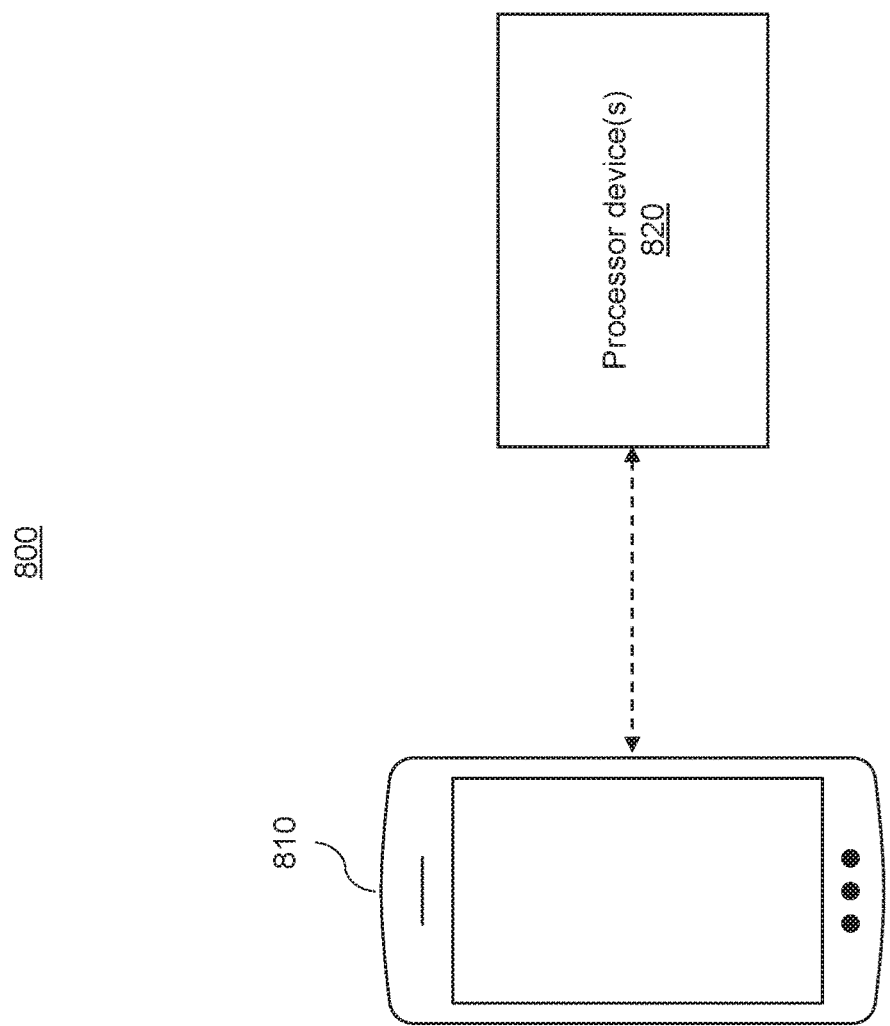
FIG. 8 is a diagram illustrating an exemplary environment for implementing a recommendation system using an asymmetrically hierarchical network, in accordance with an embodiment of the present invention.

Referring now to FIG. 8, a diagram is provided illustrating an exemplary environment 800 for implementing a recommendation system using an asymmetrically hierarchical network. As shown, the environment 810 can include a user device 810 in communication with at least one processor device 820.

The user device 810 is associated with at least one user. In this illustrative embodiment, the user device 810 is a smartphone. However, the user device 810 can be any suitable computing device in accordance with the embodiments described herein.

The user device 810 is configured to transmit data to the processor device(s) 820. For example, the data can include data reflecting the user's preference for at least one item. The processor device(s) 820 is/are configured to receive the data transmitted by the user device 810 and use the data to recommend one or more additional items to the user. The processor device(s) 820 can implement an asymmetrically hierarchical network, as described herein above with reference to FIGS. 1-7, to improve the quality of the recommendation(s).

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing a recommendation system using an asymmetrically hierarchical network, comprising:
    encoding sentences, using at least one hardware processor operatively coupled to a non-transitory computer-readable storage medium and a bidirectional recurrent neural network (BiRNN), of a set of user historical reviews associated with a user and a set of item historical reviews associated with an item to generate a set of user sentence embeddings and a set of item sentence embeddings, respectively, the user and the item corresponding to a user-item pair, the encoding representing at least one sentence by a sequence of word vectors and comprising learning a vector embedding for the at least one sentence based on the sequence of word vectors by training the BiRNN to learn the vector embedding by max-pooling hidden states of the BiRNN on the at least one sequence of word vectors;
    aggregating, using the at least one hardware processor, asymmetrically designed sentence aggregators, respective ones of the set of item sentence embeddings and the set of user sentence embeddings to generate a set of item review embeddings based on first item attention weights and a set of user review embeddings based on first user attention weights, respectively;

aggregating, using the at least one hardware processor and asymmetrically designed review aggregators, respective ones of the set of item review embeddings and the set of user review embeddings to generate an item embedding based on a second item attention weights and a user embedding based on second user attention weights, respectively; and predicting, using the at least one hardware processor, a rating of the user-item pair based on the item embedding and the user embedding.

2. The method as recited in claim 1, wherein encoding the sentence of the set of user historical reviews and the set of item historical review further includes:

encoding context information for the at least one sentence based on the vector embedding.

3. The method as recited in claim 1, wherein aggregating the set of item sentence embeddings and the set of item review embeddings further includes using respective gating mechanisms during calculation of the first item attention weights and the second item attention weights to improve model performance.

4. The method as recited in claim 1, wherein:

aggregating the set of user sentence embeddings further includes:
learning and normalizing a sentence affinity matrix between user sentences and item sentences; and
obtaining the first user attention weights based on the sentence affinity matrix and the first item attention weights; and
aggregating the set of user review embeddings further includes:
learning and normalizing a review affinity matrix between user sentences and item sentences; and
obtaining the second user attention weights based on the review affinity matrix and the second item attention weights.

5. The method as recited in claim 4, wherein:

obtaining the first user attention weights further includes performing row-wise max pooling on the sentence affinity matrix and the first item attention weight for obtaining maximum affinity; and
obtaining the second user attention weights further includes performing row-wise max pooling on the review affinity matrix and the second item attention weight for obtaining maximum affinity.

6. The method as recited in claim 5, wherein:

obtaining the first user attention weights further includes calculating the first user attention weights as $\alpha_i^u = \text{softmax}(\max_{row}(G_i \odot_{row} \alpha^v))$, where $\alpha_i^u$ corresponds to attention weights in a user review matrix including n entries for each i $\in$[1,n], $\alpha^v$ corresponds to a concatenation of the first item attention weights, $\max_{row}$ refers to row-wise max-pooling for obtaining the maximum affinity and $\odot_{row}$ refers to the Hadamard product between each row; and
obtaining the second user attention weights further includes calculating the second user attention weights as $\beta^u = \text{softmax}(\max_{row}(G \odot_{row} \beta^v))$, where $\beta^u$ corresponds to the second user attention weights, and $\beta^v$ corresponds to a concatenation of the second item attention weights.

7. The method as recited in claim 1, wherein predicting the rating of the user-item pair further includes:

receiving a concatenated vector of the item embedding and the user embedding; and
generating a predicted rating based on the concatenated vector; and calculating an error between a real rating and the predicted rating as a loss function for model training.

8. A computer program product comprising a non-transitory computer readable storage medium having program instructions embodied therewith, the program instructions executable by a computer to cause the computer to perform a method for implementing a recommendation system using an asymmetrically hierarchical network, the method performed by the computer comprising:

encoding sentences, using a bidirectional recurrent neural network (BiRNN), of a set of user historical reviews associated with a user and a set of item historical reviews associated with an item to generate a set of user sentence embeddings and a set of item sentence embeddings, respectively, the user and the item corresponding to a user-item pair, the encoding representing at least one sentence by a sequence of word vectors and comprising learning a vector embedding for the at least one sentence based on the sequence of word vectors by training the BiRNN to learn the vector embedding by max-pooling hidden states of the BiRNN on the at least one sequence of word vectors;

aggregating, using asymmetrically designed sentence aggregators, respective ones of the set of item sentence embeddings and the set of user sentence embeddings to generate a set of item review embeddings based on first item attention weights and a set of user review embeddings based on first user attention weights, respectively;

aggregating, using asymmetrically designed review aggregators, respective ones of the set of item review embeddings and the set of user review embeddings to generate an item embedding based on a second item attention weights and a user embedding based on second user attention weights, respectively; and predicting a rating of the user-item pair based on the item embedding and the user embedding.

9. The computer program product as recited in claim 8, wherein encoding the sentence of the set of user historical reviews and the set of item historical review further includes:

encoding context information for the at least one sentence based on the vector embedding.

10. The computer program product as recited in claim 8, wherein aggregating the set of item sentence embeddings and the set of item review embeddings further includes using respective gating mechanisms during calculation of the first item attention weights and the second item attention weights to improve model performance.

11. The computer program product as recited in claim 8, wherein:

aggregating the set of user sentence embeddings further includes:
learning and normalizing a sentence affinity matrix between user sentences and item sentences; and
obtaining the first user attention weights based on the sentence affinity matrix and the first item attention weights; and
aggregating the set of user review embeddings further includes:
learning and normalizing a review affinity matrix between user sentences and item sentences; and
obtaining the second user attention weights based on the review affinity matrix and the second item attention weights.

12. The computer program product as recited in claim 11, wherein:
   obtaining the first user attention weights further includes performing row-wise max pooling on the sentence affinity matrix and the first item attention weight for obtaining maximum affinity; and
   obtaining the second user attention weights further includes performing row-wise max pooling on the review affinity matrix and the second item attention weight for obtaining maximum affinity.

13. The computer program product as recited in claim 12, wherein:
   obtaining the first user attention weights further includes calculating the first user attention weights as $\alpha_i^u = \text{softmax}(\max_{row}(G_i \odot_{row} \alpha^v))$, where $\alpha_i^u$ corresponds to attention weights in a user review matrix including n entries for each i $\in[1,n]$, $\alpha^v$ corresponds to a concatenation of the first item attention weights, $\max_{row}$ refers to row-wise max-pooling for obtaining the maximum affinity and $\odot_{row}$ refers to the Hadamard product between each row; and
   obtaining the second user attention weights further includes calculating the second user attention weights as $\beta^u = \text{softmax}(\max_{row}(G \odot_{row} \beta^v))$, where $\beta^u$ corresponds to the second user attention weights, and $\beta^v$ corresponds to a concatenation of the second item attention weights.

14. The computer program product as recited in claim 8, wherein predicting the rating of the user-item pair further includes:
   receiving a concatenated vector of the item embedding and the user embedding; and
   generating a predicted rating based on the concatenated vector; and
   calculating an error between a real rating and the predicted rating as a loss function for model training.

15. A system for implementing a recommendation system using an asymmetrically hierarchical network, comprising:
   a memory device storing program code; and
   at least one processor device operatively coupled to the memory device and configured to execute program code stored on the memory device to:
      encode sentences, using a bidirectional recurrent neural network (BiRNN), of a set of user historical reviews associated with a user and a set of item historical reviews associated with an item to generate a set of user sentence embeddings and a set of item sentence embeddings, respectively, the user and the item corresponding to a user-item pair, the encoding representing at least one sentence by a sequence of word vectors and comprising learning a vector embedding for the at least one sentence based on the sequence of word vectors by training the BiRNN to learn the vector embedding by max-pooling hidden states of the BiRNN on the at least one sequence of word vectors;
      aggregate, using asymmetrically designed sentence aggregators, respective ones of the set of item sentence embeddings and the set of user sentence embeddings to generate a set of item review embeddings and a set of user review embeddings, respectively;
      aggregate, using asymmetrically designed review aggregators, respective ones of the set of item review embeddings and the set of user review embeddings to generate an item embedding and a user embedding, respectively; and
      predict a rating of the user-item pair based on the item embedding and the user embedding.

16. The system as recited in claim 15, wherein the at least one processor device is further configured to aggregate the set of item sentence embeddings and the set of item review embeddings by using respective gating mechanisms during calculation of the first item attention weights and the second item attention weights to improve model performance.

17. The system as recited in claim 15, wherein:
   the at least one processor device is further configured to aggregate the set of user sentence embeddings by:
      learning and normalizing a sentence affinity matrix between user sentences and item sentences; and
      obtaining the first user attention weights based on the sentence affinity matrix and the first item attention weights; and
   the at least one processor device is further configured to aggregate the set of user review embeddings by:
      learning and normalizing a review affinity matrix between user sentences and item sentences; and
      obtaining the second user attention weights based on the review affinity matrix and the second item attention weights.

18. The system as recited in claim 17, wherein the at least one processor device is further configured to:
   obtain the first user attention weights by performing row-wise max pooling on the sentence affinity matrix and the first item attention weight for obtaining maximum affinity; and
   obtain the second user attention weights by performing row-wise max pooling on the review affinity matrix and the second item attention weight for obtaining maximum affinity.

19. The system as recited in claim 18, wherein:
   the at least one processor device is further configured to obtain the first user attention weights by calculating the first user attention weights as $\alpha_i^u = \text{softmax}(\max_{row}(G_i \odot_{row} \alpha^v))$ where $\alpha_i^u$ corresponds to attention weights in a user review matrix including n entries for each i $\in[1,n]$, $\alpha^v$ corresponds to a concatenation of the first item attention weights, $\max_{row}$ refers to row-wise max-pooling for obtaining the maximum affinity and $\odot_{row}$ refers to the Hadamard product between each row; and
   the at least one processor device is further configured to obtain the second user attention weights by calculating the second user attention weights as $\beta^u = \text{softmax}(\max_{row}(G \odot_{row} \beta^v))$, where $\beta^u$ corresponds to the second user attention weights, and $\beta^v$ corresponds to a concatenation of the second item attention weights.

20. The system as recited in claim 15 wherein the at least one processor device is further configured to predict the rating of the user-item pair by:
   receiving a concatenated vector of the item embedding and the user embedding; and
   generating a predicted rating based on the concatenated vector; and
   calculating an error between a real rating and the predicted rating as a loss function for model training.

* * * * *